US012599062B2

(12) United States Patent
Flygare et al.

(10) Patent No.: US 12,599,062 B2
(45) Date of Patent: Apr. 14, 2026

(54) YARD MAINTENANCE VEHICLE WITH ADVANCED TILT MONITORING CAPABILITIES

(71) Applicant: HUSQVARNA AB, Huskvarna (SE)

(72) Inventors: Anders Flygare, Jönköping (SE); Dick Marcusson, Taberg (SE)

(73) Assignee: HUSQVARNA AB, Huskvarna (SE)

( * ) Notice: Subject to any disclaimer, the term of this patent is extended or adjusted under 35 U.S.C. 154(b) by 627 days.

(21) Appl. No.: 18/011,623

(22) PCT Filed: Sep. 29, 2021

(86) PCT No.: PCT/IB2021/058962
§ 371 (c)(1),
(2) Date: Dec. 20, 2022

(87) PCT Pub. No.: WO2022/224032
PCT Pub. Date: Oct. 27, 2022

(65) Prior Publication Data
US 2023/0225254 A1 Jul. 20, 2023

(30) Foreign Application Priority Data
Apr. 21, 2021 (SE) .................................... 2150494-9

(51) Int. Cl.
A01D 75/28 (2006.01)
A01D 34/64 (2006.01)
A01D 101/00 (2006.01)

(52) U.S. Cl.
CPC ............. A01D 75/28 (2013.01); A01D 34/64 (2013.01); A01D 2101/00 (2013.01)

(58) Field of Classification Search
CPC ..... A01D 75/28; A01D 34/64; A01D 2101/00
(Continued)

(56) References Cited

U.S. PATENT DOCUMENTS 6,056,501 A * 5/2000 Ishikawa ............... B66F 9/0755
280/124.112
7,987,031 B2 * 7/2011 Diebold .............. B60R 21/0132
280/801.1
(Continued)

FOREIGN PATENT DOCUMENTS

CN 202511943 U 10/2012
CN 102620890 B 3/2013
(Continued)

OTHER PUBLICATIONS

International Search Report and Written Opinion for International Application No. PCT/IB2021/058962 mailed Mar. 21, 2022.
(Continued)

*Primary Examiner* — Manglesh M Patel
(74) *Attorney, Agent, or Firm* — Burr & Forman

(57) ABSTRACT

A tilt monitoring assembly (200) for a yard maintenance vehicle (10) may include processing circuitry (210) configured to receive speed information indicative of a current speed of the vehicle (500), receive orientation information indicative of a three dimensional orientation of the vehicle (510), receive weight information indicative of operator weight associated with a driver of the vehicle (530), determine a tilt status based on the speed information, the orientation information and the weight information (540), and provide an output associated with operation of the vehicle based on the tilt status (550).

15 Claims, 7 Drawing Sheets

(58) Field of Classification Search
USPC ................................................. 701/50, 124
See application file for complete search history.

(56) References Cited

U.S. PATENT DOCUMENTS

| | | | |
|---|---|---|---|
| 8,108,107 B2 * | 1/2012 | Kohler .............. | B60R 21/01516 |
| | | | 180/274 |
| 8,352,116 B2 | 1/2013 | Boylston et al. | |
| 8,459,662 B2 | 6/2013 | Baird | |
| 2002/0109310 A1 * | 8/2002 | Lim ..................... | B60G 17/015 |
| | | | 280/5.508 |
| 2005/0108999 A1 | 5/2005 | Bucher | |
| 2006/0076741 A1 * | 4/2006 | Lim ................... | B60G 17/0162 |
| | | | 280/5.508 |
| 2009/0182471 A1 | 7/2009 | Bucher et al. | |
| 2010/0212276 A1 * | 8/2010 | Digman .............. | A01D 75/287 |
| | | | 56/10.2 E |
| 2010/0250073 A1 * | 9/2010 | McCabe .................. | B66F 9/24 |
| | | | 701/50 |
| 2011/0022267 A1 | 1/2011 | Murphy | |
| 2015/0008653 A1 * | 1/2015 | Burns, Jr. ............. | F16H 19/005 |
| | | | 280/93.502 |
| 2018/0229985 A1 * | 8/2018 | Urff ....................... | A62B 3/005 |
| 2019/0166758 A1 * | 6/2019 | Phillip ................... | A01D 34/82 |
| 2020/0187421 A1 | 6/2020 | Aoki et al. | |

FOREIGN PATENT DOCUMENTS

| | | |
|---|---|---|
| CN | 104108344 A | 10/2014 |
| CN | 106740461 A | 5/2017 |
| CN | 105636859 B | 7/2020 |
| EP | 1270335 A1 | 1/2003 |
| KR | 20190093055 A | 8/2019 |
| KR | 2051967 B1 | 12/2019 |
| WO | 03021190 A1 | 3/2003 |
| WO | 2015028973 A2 | 3/2015 |

OTHER PUBLICATIONS

Search Report and Office Action for Swedish Application No. 2150494-9 mailed Dec. 7, 2021.

* cited by examiner

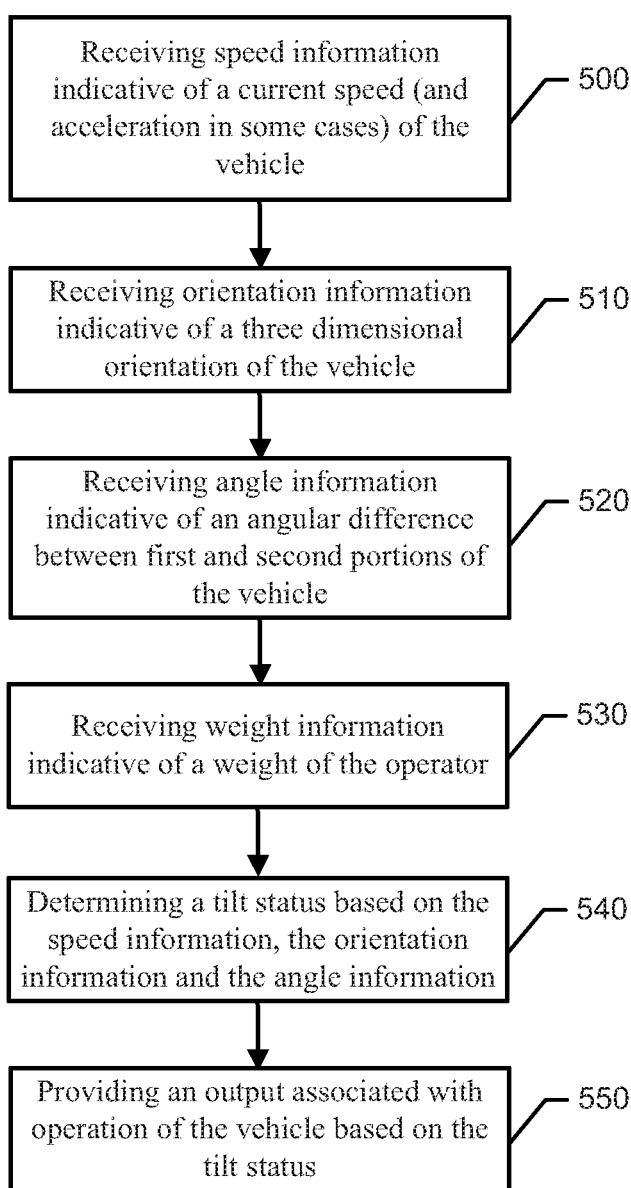

Receiving speed information indicative of a current speed (and acceleration in some cases) of the vehicle — 500

Receiving orientation information indicative of a three dimensional orientation of the vehicle — 510

Receiving angle information indicative of an angular difference between first and second portions of the vehicle — 520

Receiving weight information indicative of a weight of the operator — 530

Determining a tilt status based on the speed information, the orientation information and the angle information — 540

Providing an output associated with operation of the vehicle based on the tilt status — 550

FIG. 7

YARD MAINTENANCE VEHICLE WITH ADVANCED TILT MONITORING CAPABILITIES

TECHNICAL FIELD

Example embodiments generally relate to yard maintenance vehicles and, more particularly, relate to a yard maintenance vehicle that employs tilt monitoring capabilities that are sensitive to driver weight and complicated support situations.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors and articulated riders, can be much larger. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

As can be appreciated from the description above, riding yard maintenance vehicles may come in many different sizes and may have wide variances in their capabilities. However, beyond mere changes in size and function, riding yard maintenance vehicles can also be produced with a great deal of variation in relation to the configurations via which various ones of the functions they can perform are provided. For example, some riding yard maintenance vehicles may have attachments that are rear mounted, front mounted, or even mounted between the front and back wheels. Moreover, some riding yard maintenance vehicles may be configured to place the operator at different seated or standing locations on the vehicle. Still other vehicles may have split or articulated chassis structures.

As can be appreciated from the description above, the wide variation in design for riding yard maintenance vehicles can also complicate the design of systems that are aimed at improving handling and operation of the vehicles in various different environments. For example, articulated riders are designed such that the distance between the rear wheels and front wheels changes during the course of a turn. This alters the support situation for the vehicle in that the wheels are not at a fixed location relative to the center of gravity of the vehicle. Moreover, the center of gravity itself may change during a turn, and may move away from a line connecting a central point between the front wheels and a central point between the rear wheels. This moving center of gravity is potentially further complicated by other factors. In this regard, both the weight of the driver and the slope of the terrain on which the vehicle is operating can significantly change the center of gravity. These wide variances have, in the past, made it difficult to even consider provision of tilt monitoring and mitigation techniques for many riding lawn care vehicles beyond very rudimentary techniques that are loaded with assumptions that may ultimately be incorrect.

Accordingly, it may be desirable to develop a way to measure changes in the center of gravity of a riding yard maintenance vehicle to provide improved accuracy in tilt monitoring so that, for example, better mitigation strategies may also be employed to improve the driving experience.

BRIEF SUMMARY OF SOME EXAMPLES

Some example embodiments may provide a tilt monitoring system that avoids the problems discussed above.

In an example embodiment, a riding yard maintenance vehicle is provided. The riding yard maintenance vehicle may include an articulated frame having a first portion to which front wheels of the vehicle are attached and a second portion to which rear wheels of the vehicle are attachable, a steering assembly operably coupled to the front wheels or the rear wheels of the vehicle to provide steering inputs by an operator of the vehicle, and a tilt monitoring assembly including processing circuitry. The processing circuitry may be configured to receive speed information indicative of a current speed of the vehicle, receive orientation information indicative of a three dimensional orientation of the vehicle, receive angle information indicative of an angular difference between the first and second portions of the vehicle, receive weight information indicative of a weight of the operator, determine a tilt status based on the speed information, the orientation information and the angle information, and provide an output associated with operation of the vehicle based on the tilt status.

In another example embodiment, a tilt monitoring assembly for a vehicle is provided. The tilt monitoring assembly for a yard maintenance vehicle may include processing circuitry configured to receive speed information indicative of a current speed of the vehicle, receive orientation information indicative of a three dimensional orientation of the vehicle, receive weight information indicative of operator weight associated with a driver of the vehicle, determine a tilt status based on the speed information, the orientation information and the weight information, and provide an output associated with operation of the vehicle based on the tilt status.

In another example embodiment, a tilt monitoring assembly for an articulated yard maintenance vehicle may be provided. The assembly may include processing circuitry configured to receive speed information indicative of a current speed of the vehicle, receive orientation information indicative of a three dimensional orientation of the vehicle, receive angle information indicative of an angular difference between headings of a first part of the vehicle at which front wheels are disposed and a second part of the vehicle at which rear wheels are disposed where the first and second parts of the vehicle are operably coupled via an articulated joint, determine a tilt status based on the speed information, the orientation information and the angle information, and provide an output associated with operation of the vehicle based on the tilt status.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates a perspective view of a riding yard maintenance vehicle according to an example embodiment;

FIG. 2, which is defined by FIGS. 2A and 2B, illustrates a top view of impacts on center of gravity for steering an articulated version of a riding yard maintenance vehicle of an example embodiment;

FIG. 3, which is defined by FIGS. 3A and 3B, illustrates a side view of impacts on center of gravity for steering the riding yard maintenance vehicle of an example embodiment;

FIG. 4, which is defined by FIGS. 4A and 4B, illustrates a perspective view of impacts on center of gravity for steering the riding yard maintenance vehicle of an example embodiment on a slope;

FIG. 7 illustrates a block diagram of a method according to an example embodiment.

DETAILED DESCRIPTION

Figure 1:
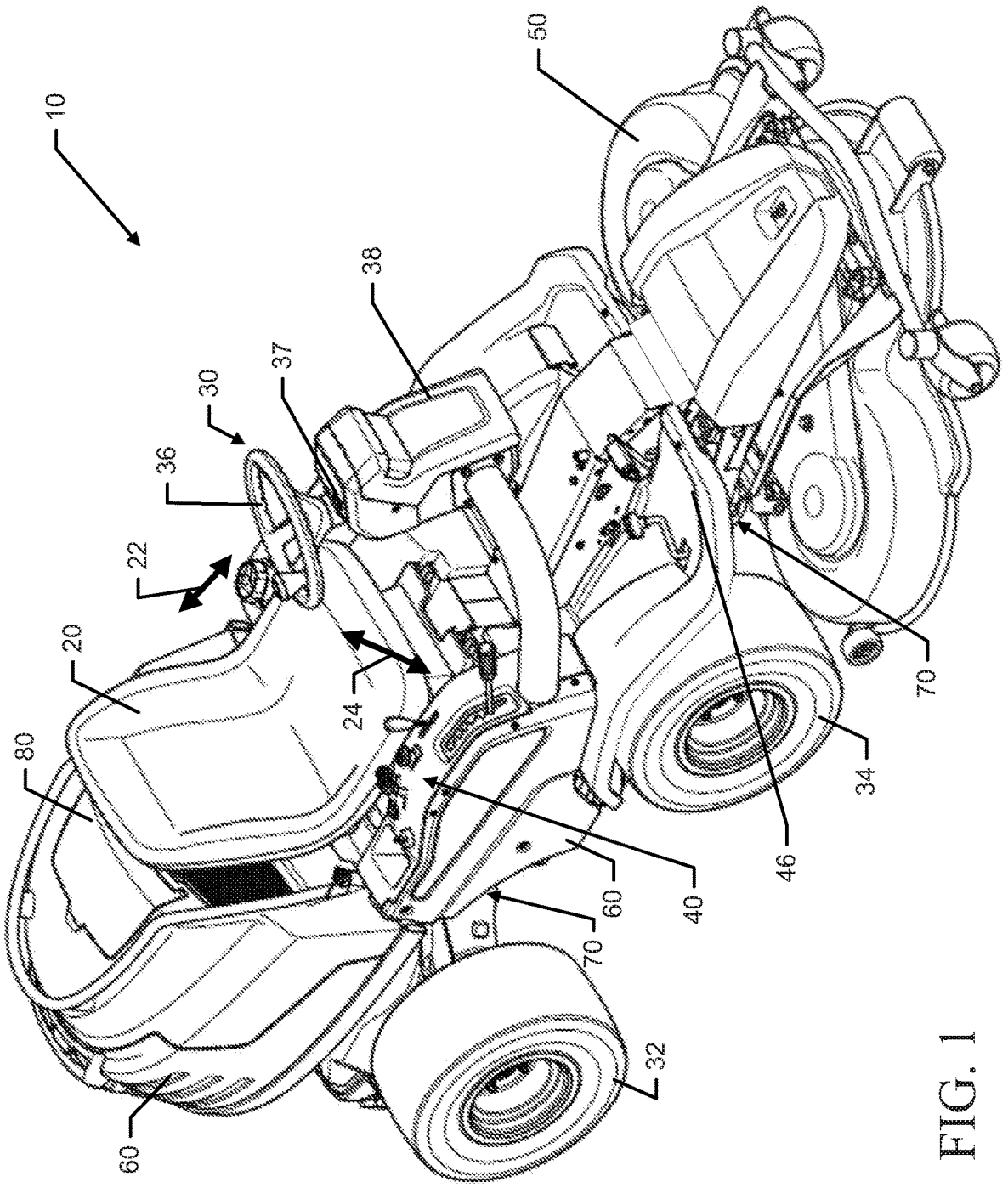

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may provide an improved tilt monitoring capability that avoids the problems discussed above. In this regard, example embodiments can improve the ability to determine the center of gravity of a yard maintenance vehicle for articulated riders and/or for various changes in operator weight (or weight distribution). Example embodiments may employ weight sensors to determine (with accuracy) the weight of the operator and, in some cases, be able to detect changes in weight distribution where positioning of the operator is also variable. Example embodiments may also be enabled to incorporate knowledge of the unique geometries between front and rear portions of articulated riders during a turn in order to understand how the center of gravity moves relative to a longitudinal centerline of the vehicle, which may impact turning capabilities on slopes. Various conditional awareness notifications (e.g., status indicators, alerts or warnings) may be provided to the operator and, in some cases, automated controls may be employed to improve handling of the vehicle for the specific situation the vehicle is in (or approaching) at each instant during operation.

FIG. 1 illustrates a riding yard maintenance vehicle 10 as one example of a host device that may employ a tilt monitoring assembly according to an example embodiment. The particular model shown, which includes front mounted equipment and is an articulated rider, is not necessarily the only model of host device or vehicle to which example embodiments may be applicable. As such, other models, including models without front mounts and without articulated steering, could also be operated with the tilt monitoring assembly (or versions thereof) as described herein.

In some embodiments, the riding yard maintenance vehicle 10 may include a seat 20 that may be disposed at a center, rear or front portion of the riding yard maintenance vehicle 10. Although not required, the seat 20 may be adjustable in some cases. In this regard, for example, the operator may be enabled to move the seat 20 forward or rearward as shown by double arrow 22. Additionally or alternatively, the seat 20 may be adjustable in height as shown by double arrow 24 so that the operator may ride higher or lower relative to the chassis of the riding yard maintenance vehicle 10 (and therefore also relative to the ground or surface on which the riding yard maintenance vehicle 10 is driving). As will be discussed in greater detail below, the movement of the seat 20 may impact the center of gravity of the riding yard maintenance vehicle 10. Thus, sensitivity to any changes in movement of the seat 20 may also provide improved accuracy with respect to tilt monitoring.

The riding yard maintenance vehicle 10 may also include a steering assembly 30 (e.g., a steering wheel, handle bars, joystick(s) or the like) operably coupled to rear wheels 32 of the riding yard maintenance vehicle 10 to allow the operator to steer the riding yard maintenance vehicle 10 via steering inputs that are communicated to the rear wheels 32 (or front wheels 34). However, other steering arrangements are possible in other embodiments and the type of steering assembly 30 employed is not limiting to example embodiments.

In an example embodiment, the steering assembly 30 may include a steering wheel 36 and a steering column 37. The steering column 37 may operably connect to additional steering assembly components or, in other embodiments, to the front wheels 34. Moreover, in some embodiments, the steering column 37 may extend into a steering console 38, which may provide a cover to improve the aesthetic appearance of the riding yard maintenance vehicle 10 by obscuring the view of various mechanical components associated with the steering assembly 30. In some examples, the steering assembly 30 may include other equipment (e.g., steering levers or handlebars) instead of the steering wheel 36.

The operator may sit on the seat 20, which may be disposed to the rear of the steering assembly 30 to provide input for steering of the riding yard maintenance vehicle 10 via the steering assembly 30. The riding yard maintenance vehicle 10 may also include additional control related components that may be disposed at a control panel 40, which may be positioned proximate to the seat 20 to enable an operator to easily access various control related components located at the control panel 40. The control related components may include levers, switches and/or the like configured to provide control over certain functions or components such as a blade speed adjuster, a choke control, a cutting height adjuster and/or a cutting unit lifting controller. Various feedback mechanisms (e.g., lights, visual displays, status indicators, etc.) may be provided at the control panel 40 and/or at the steering wheel 36 or steering console 38 in some embodiments.

In some cases, one or more additional controllers, may be provided in the form of foot pedals that may sit proximate to a footrest 46 (which may include a portion on both sides of the riding yard maintenance vehicle 10 (e.g., on opposite sides of the steering console 38)) to enable the operator to rest his or her feet thereon while seated in the seat 20. These foot pedals may provide speed control for forward and/or backward operation, breaking, cutting deck lifting or other functions. Other levers, operators or components are possible in other examples as well.

In some example embodiments, the steering assembly 30 may be embodied as an assembly of metallic or other rigid components that may be welded, fitted, bolted or otherwise operably coupled to each other and coupled to the wheels (e.g., rear wheels 32 and/or front wheels 34) of the riding yard maintenance vehicle 10 to which steering inputs are provided. For example, the steering assembly 30 may include or otherwise be coupled with a steering cable assembly or a system of mechanical linkages (e.g., pulleys, tie rods, cams, and/or other mechanical components) to translate rotational motion applied to the steering assembly 30 (and more particularly to the steering wheel 36) into directional inputs to orient the wheels accordingly. Other steering control systems may be employed in some alternative embodiments.

The riding yard maintenance vehicle 10 may also include, or be configured to support attachment of, a cutting deck 50 having at least one cutting blade mounted therein. The cutting deck 50 may be a removable attachment that may be positioned in front of the front wheels 34 in a position to enable the operator to cut grass using the cutting blades when the cutting blades are rotated below the cutting deck 50 and the cutting deck 50 is in a cutting position. When operating to cut grass, some example embodiments may provide that the grass clippings may be captured by a collection system, mulched, or expelled from the cutting deck 50 (e.g., via a discharge that may be directed to a side or rear of the cutting deck and/or riding yard maintenance vehicle 10). In some embodiments, the cutting deck 50 may be replaced by other working attachments to change the configuration of the riding yard maintenance vehicle 10 and correspondingly change the tasks that may be performed by the riding yard maintenance vehicle 10. Thus, for example, a plow blade or snow blower attachment may be provided to convert the riding yard maintenance vehicle 10 into a snow removal device. Alternatively, a tiller attachment may be provided to convert the riding yard maintenance vehicle 10 into a ride-on or remote control operable tiller.

Other attachments and configurations are also possible such as a bagging attachment, sweeper, brush cutter, or the like. In each case, the different type of attachment may be considered to be a respective different type of accessory that can be powered by the riding yard maintenance vehicle 10 (as one example host device). The different attachments may also impact center of gravity calculations with respect to tilt monitoring, and thus, in some cases, the tilt monitoring assembly may be further aware of any accessories added to the riding yard maintenance vehicle 10 to consider such attachments in tilt monitoring, and more particularly in relation to determining the center of gravity of the riding yard maintenance vehicle 10.

In the pictured example embodiment of FIG. 1, an engine of the riding yard maintenance vehicle 10 is disposed in an engine compartment 60 that is behind a seated operator in a rear portion of the riding yard maintenance vehicle 10. However, in other example embodiments, the engine could be in different positions such as in front of or below the operator. In some embodiments, the engine may be operably coupled to one or more of the wheels of the riding yard maintenance vehicle 10 in order to provide drive power for the riding yard maintenance vehicle 10. In some embodiments, the engine may be capable of powering two wheels, while in others, the engine may power all four wheels of the riding yard maintenance vehicle 10. Moreover, in some cases, the engine may manually or automatically shift between powering either some wheels or all four wheels of the riding yard maintenance vehicle 10.

The engine, the steering assembly 30, the cutting deck 50, the seat 20 and other components of the riding yard maintenance vehicle 10 may be operably connected (directly or indirectly) to a frame 60 of the riding yard maintenance vehicle 10. The frame 60 may be a rigid structure configured to provide support, connectivity and interoperability functions for various ones of the components of the riding yard maintenance vehicle 10. In some embodiments, the frame 60 may be split or articulated such that, for example, the front wheels 34 are disposed on an opposite portion of the frame 60 than the portion of the frame 60 on which the back wheels 32 are disposed with respect to an articulated joint 70 in the frame.

Due to the inclusion of the articulated joint 70, resultant steering geometries change during a turn of the riding yard maintenance vehicle 10. The changes in geometry will tend to correspondingly change the center of gravity of the riding yard maintenance vehicle 10. Moreover, in certain situations (such as on a hillside or slope), steering geometries that are quite stable when the riding yard maintenance vehicle 10 operates on flat ground may be impacted. The weight of the operator, and any other changes to the weight distribution may also impact the center of gravity. The tilt monitoring assembly of an example embodiment may account for each of these factors, as well as the speed (including acceleration or deceleration of the riding yard maintenance vehicle 10, to determine whether changes to center of gravity and various conditions experienced in real time may lead to tilt-related issues. The tilt monitoring assembly may then either inform the operator of such issues or, in some cases, take automatic actions to mitigate tilt risk.

Figures 2A, 2B:
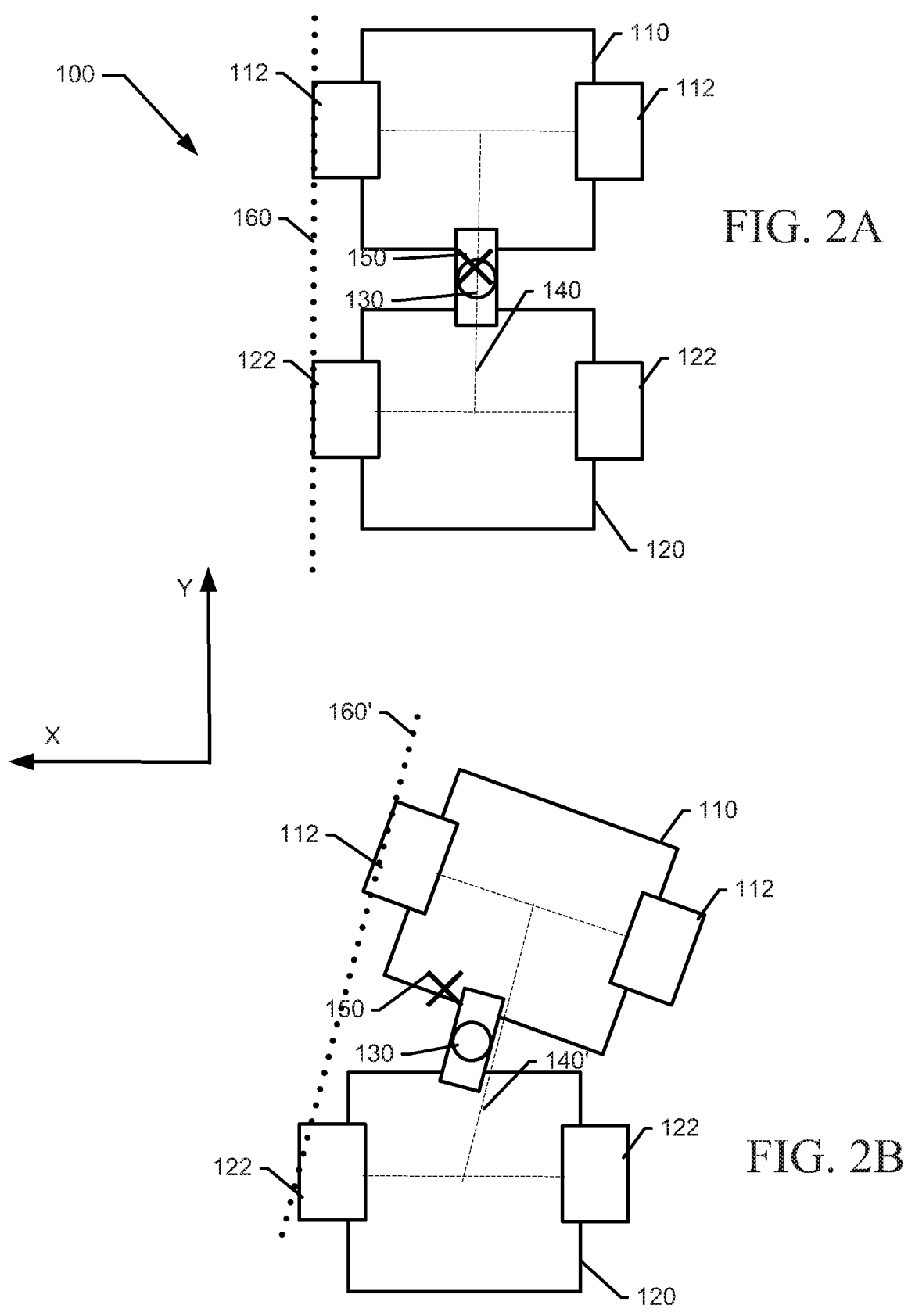

FIGS. 2-4 illustrate various conditions or situations and their respective impacts on the center of gravity of the riding yard maintenance vehicle 10. In this regard, FIG. 2, which is defined by FIGS. 2A and 2B, illustrates a schematic top view of a vehicle 100 (e.g., of which the riding yard maintenance vehicle 10 of FIG. 1 is an example) driving straight (FIG. 2A) and therefore having a 0 degree steering or turning angle and also engaged in a turn (FIG. 2B). Referring first to FIG. 2A, a front vehicle portion 110 including front wheels 112 is shown from above, and is operably coupled to a rear vehicle portion 120 including rear wheels 122. The operable coupling is provided by an articulated joint 130 (e.g., of which articulated joint 70 of FIG. 1 is an example). A longitudinal centerline 140 of the vehicle 100 is shown extending from a midpoint between the front wheels 112 to a midpoint between the rear wheels 122.

A possible location for a center of gravity 150 (at least in the X-Y dimension) is shown to be located near the articulated joint 130 in this example. One may assume that the weight and weight distributions of the front vehicle portion 110 and the rear vehicle portion 120 are relatively even in this example, but it should be appreciated that the center of gravity 150 could alternatively be moved forward or rearward if there is a weight imbalance therebetween. In any case, the center of gravity 150 generally falls along the longitudinal centerline 140. Additionally, the front and rear wheels 112 and 122 define a base (e.g., a support base) for the vehicle 100.

A tipping point for the vehicle 100 would be reached when the center of gravity 150 passes outside the base. Thus, for example, a theoretical lateral base limit 160 on the left side of the vehicle is shown in FIG. 2A. If the center of gravity 150 were to move to the left past the theoretical lateral base limit 160, the vehicle 100 could be expected to tip over.

FIG. 2B shows the vehicle 100 during a turn to the right. As shown in FIG. 2B, the turning of the vehicle 100 causes a change in the position of the center of gravity 150 as the weight of the vehicle 100 generally tends to continue to follow its prior path due to inertia. Meanwhile, the turning of the vehicle 100 also changes the support base. Accordingly, as shown in FIG. 2B proximity between the new lateral base limit 160' and the center of gravity 150 is decreased, thereby meaning less margin to the tipping point. Generally speaking, faster movement of the vehicle 100 when the turn is begun, and increased severity of the turn will both cause more movement of the center of gravity 150 toward the new lateral base limit 160'.

Figures 3A, 3B:
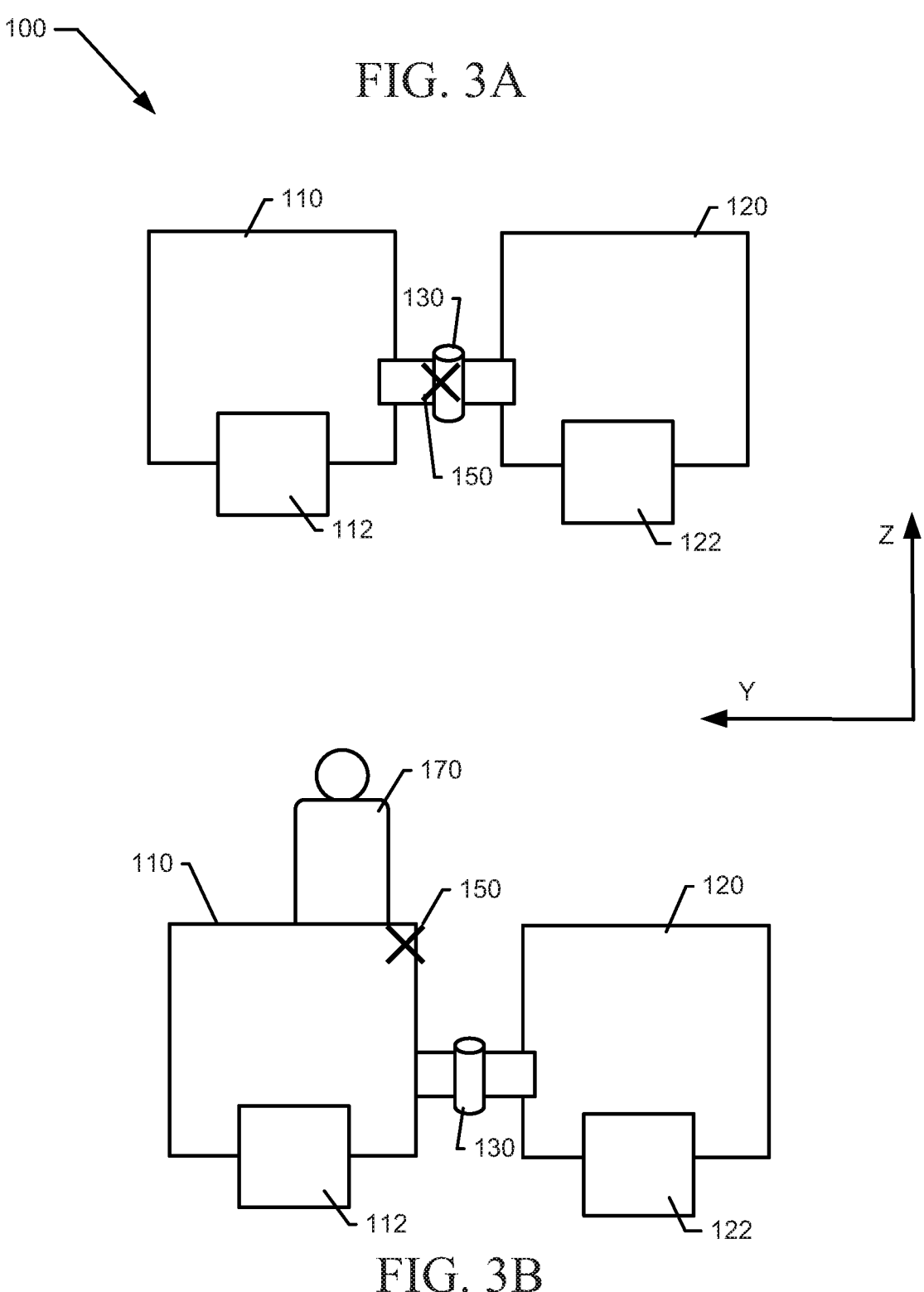

The height of the center of gravity is also important to consider. Thus, as shown in FIG. 3A, the center of gravity 150 may be relatively low (which is better for stability) when the driver is not seated on the vehicle 100. However, when the driver 170 is seated on the vehicle 100, as shown in FIG. 3B, additional weight may be added at a higher elevation, and thereby move the center of gravity 150 toward the driver 170 (in a fore/aft direction) and also move the center of gravity 150 higher. The higher center of gravity 150 may also impact tipping, as the higher center of gravity 150 may more rapidly reach the lateral base limit 160 and cause tipping sooner (especially at high speeds or during large turns).

Figures 4A, 4B:
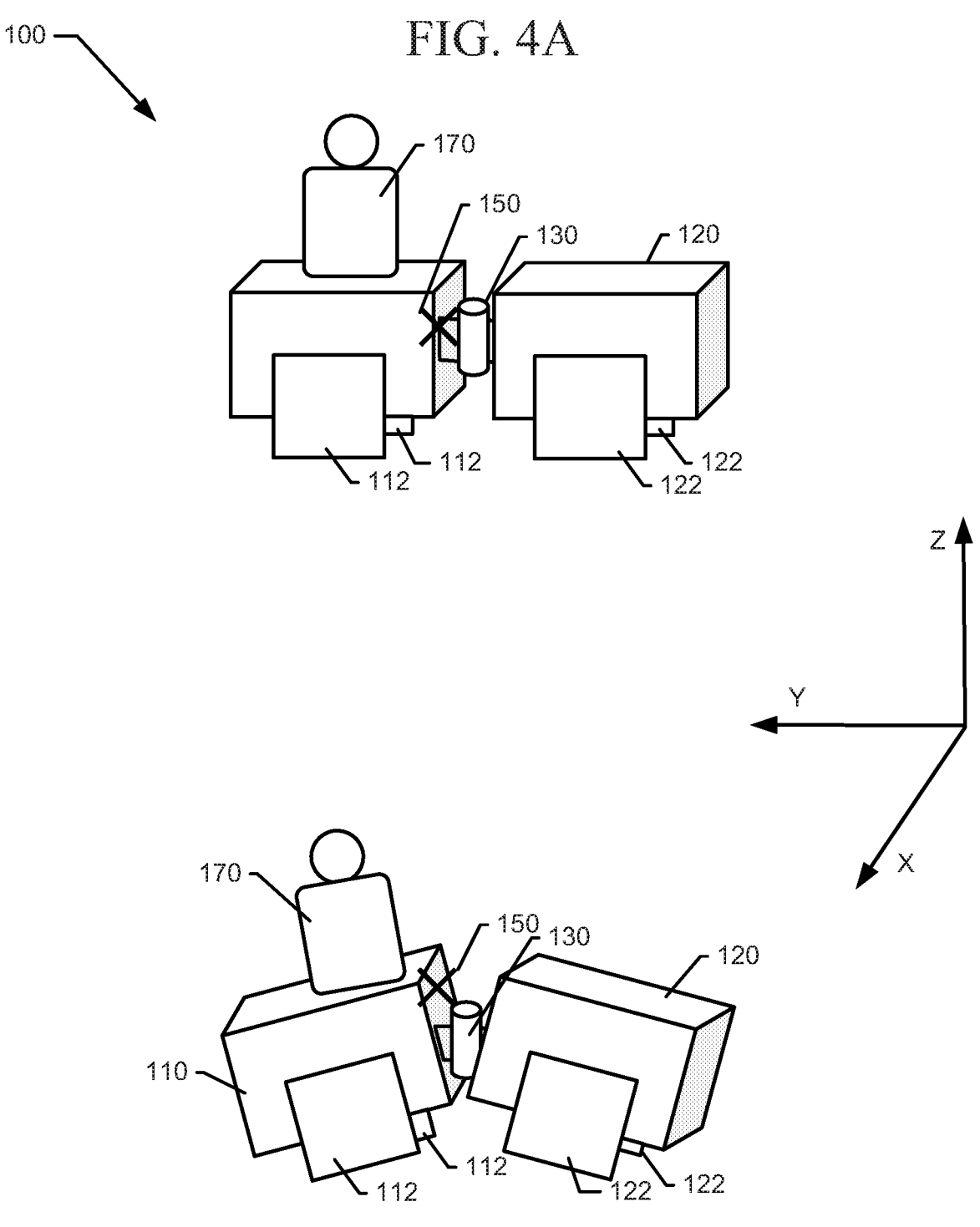
Figure 5:
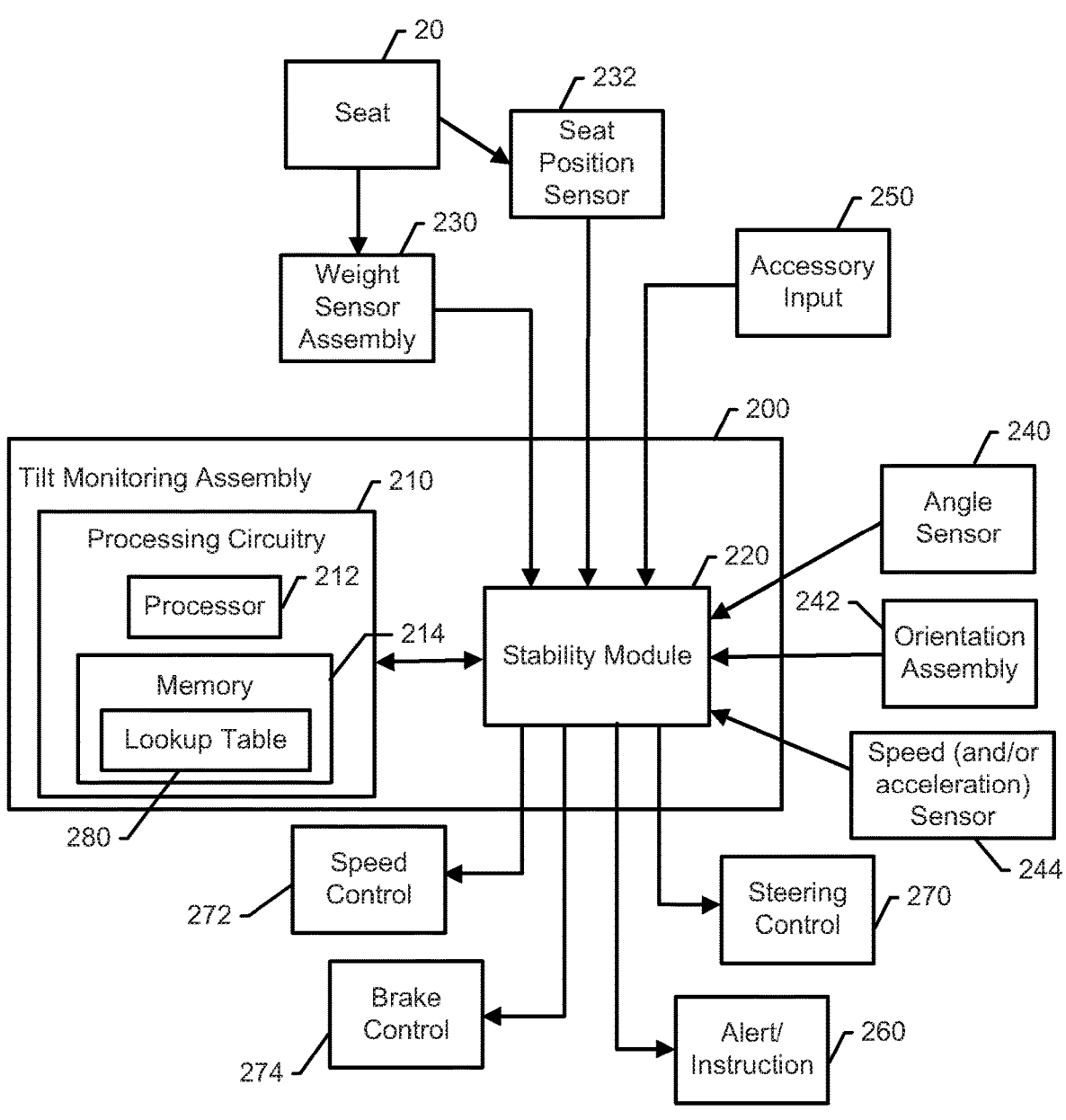
FIG. 5 illustrates a schematic view of various components of a tilt monitoring assembly according to an example embodiment.

If operation on a slope is added to the situation, as shown in FIGS. 4A and 4B, the proximity to a tipping point may be decreased even further. In this regard, as shown in FIG. 4A, the vehicle 100 is operating on a slope so that the right wheels are higher in elevation than the left wheels. The center of gravity 150 can be seen to have moved toward the left side of the vehicle 100. In FIG. 4B, the vehicle 100 is engaged in a left turn (i.e., a turn toward the left) while on the slope. The center of gravity 150 may move higher during the turn, but since the turn is also to the left, the center of gravity may move to the right as well, thereby offsetting (at least slightly) the movement of the center of gravity 150 toward the lateral base limit that would be caused by the turn. However, if the turn was instead to the right, then both the slope and the turn impacts would combine to move the center of gravity 150 left and reduce the margin to the tipping point. This matched directly with experiences many of us have had on numerous occasions. In this regard, when operating on a side slope, turning down slope feels much more comfortable than turning up slope.

All of these phenomena are well understood and involve basic physics. However, although the phenomena occur around us all the time and in all situations, calculation of exact values to evaluate vehicle operations is not common. That said, many vehicles include computers or processing circuitry of some kind onboard. Thus, the capability certainly exists to perform various calculations. However, even for vehicles that do have the capability and perform calculations relating to determining stability-related factors that affect a vehicle, such calculations generally ignore the weight of the driver 170 or other weight related structural changes (e.g., load or accessory layout). Moreover, the complications added by virtue of the fact that an articulated vehicle does not have a common base that never changes, which would simplify any stability calculations tremendously, are difficult to overcome. Nevertheless, example embodiments provide a robust capability for determining factors that may impact margin to a tipping point in a comprehensive tilt monitoring assembly that is applicable to an articulated vehicle.

FIG. 4 illustrates a block diagram of a tilt monitoring assembly 200 of an example embodiment. The tilt monitoring assembly 200 may include processing circuitry 210, which may be part of or otherwise embodied as an electronic control unit (ECU) or other controller or processing circuitry of the riding yard maintenance vehicle 10 or vehicle 100 described above. The processing circuitry 210 may be configured to perform data processing, and control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a stability module 220. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate (directly or indirectly) with electronic components and/or sensors (e.g., weight sensors of a weight sensor assembly 230, a seat position sensor 232, an angle sensor 240, an orientation assembly 242, a speed sensor 244, and/or the like) of the vehicle 100 via a single data bus or multiple buses/electrical connections. In some cases, the data bus may connect to a plurality or all of the sensors and/or other electrically controlled components of the vehicle 100.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the stability module 220. As such, in some embodiments, the processor 212 (or the processing circuitry 210) may be said to cause each of the operations described in connection with the stability module 220 by directing the stability module 220 to undertake the corresponding functionalities responsive to execution of instructions or algorithms configuring the processor 212 (or processing circuitry 210) accordingly. As an example, the stability module 220 may be configured to receive a variety of inputs from various sources and make calculations or determinations associated with tilt monitoring as described herein. The stability module 220 may then, as a result of such monitoring issue information, alerts, instructions or the like to facilitate operation of the vehicle 100 based on the data received and the calculations or determinations made.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the stability module 220 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from sensors or other components. Among the contents of the memory 214, applications may be stored for execution by the processor 212 in order to carry out the functionality associated with each respective application. In some cases, the applications may include instructions for tilt monitoring and issuing information, alerts or instructions based on the tilt monitoring.

In an example embodiment, the stability module 220 may be configured to receive speed information (including data showing a rate of acceleration or deceleration) from the speed sensor 244. The speed sensor 244 may be a GPS sensor, an accelerometer, a speedometer, or any other suitable device capable of measuring speed of the vehicle 100. The stability module 220 may also receive angular difference information indicating a difference in heading or angular orientation between the front vehicle portion 110 and the rear vehicle portion 120 of the vehicle 100 as provided by angle sensor 240. The angle sensor 240 may include one or more Hall effect sensors, resistance measurements, capacitive measurements, or various other electrical measurements generated in or proximate to the articulated joint 130. Alternatively, GPS sensors on each of the front vehicle portion 110 and the rear vehicle portion 120 may be capable of being used to determine a heading of each portion, respectively. The heading differences may then be used to determine the angular orientation difference.

The orientation assembly 242 may include one or more sensors (e.g., accelerometers, gyroscopes, etc.) that can be used to generate data corresponding to horizontal, vertical, and rotational accelerations of the vehicle 100, and communicate such data to the processing circuitry 210 (or stability module 220). As such, information such as pitch angle, roll angle and yaw angle may be determinable using the orientation assembly 242. In an example embodiment, sensors may separately be provided on the front vehicle portion 110 and the rear vehicle portion 120 to obtain independent orientation information for each of the front vehicle portion 110 and the rear vehicle portion 120, respectively. However, in some alternatives, a centrally located or single instance of the orientation assembly 242 may be used to determine the orientation of the vehicle 100 in three dimensional space.

The orientation may indicate operation on a slope, and the position of the vehicle 100 on the slope, for example.

The stability module 220 may also receive inputs from a weight sensor assembly 230, which is configured to determine the weight of the driver 170 disposed on the seat 20 of the vehicle 100. The weight sensor assembly 230 may include a scale configured to directly measure the weight of the driver 170 in some cases. However, in other cases, the weight sensor assembly 230 may be implemented in other, perhaps simpler, ways. For example, a series of limit switches may be engaged based on the vertical position of the seat 20. Each limit switch may correspond to subsequently increasing ranges of weights for the driver 170. Thus, a light driver may trigger only a first limit switch, and increasingly heavy drivers may trigger increasingly more limit switches to define additional weight values for the driver 170.

Although not required, in some cases, even the position of the seat 20 may be measured to permit more accurate calculation of the center of gravity 150. In this regard, for example, if the seat 20 is adjustable, the seat position sensor 232 may detect at which position the seat 20 is currently located (higher/lower, forward/rearward, etc.). The seat position sensor 232 may also use limit switches or various capacitive, resistive, Hall effect or other sensors to determine the position of the seat 20. In any case, the weight of the driver 170, and the location of the weight if such location is adjustable, can clearly (and potentially significantly) modify the center of gravity of the vehicle 100. Thus, even if, for example, the vehicle 100 is operable entirely remotely, the weight of the driver 170 (or lack of such weight) should be accounted for by the stability module 220 in determining the tilt status.

Although not required, the stability module 220 may also receive an accessory input 250. The accessory input 250 may be automatically determined (e.g., via sensors that detect the presence of specific accessories) or may be a manual input provided by the driver 170 (e.g., at the control panel 40 or another user interface). The accessory input 250 may indicate that a particular accessory (e.g., a removable piece of equipment such as a cutting deck, bagging attachment, or various other working elements) is attached to the vehicle 100.

The stability module 220 may be configured to perform tilt monitoring based on all of the inputs received. In this regard, for example, the stability module 220 may be configured to determine, based on the inputs received, a stability status indication. The stability status indication may, in some cases, include an indication of a proximity to a tipping point or a stability margin by comparing a determined center of gravity to a calculated base limit. The calculated base limit may be determined based on known information about the vehicle 100 (e.g., track width and wheelbase) as modified by the positions of the wheels for the current vehicle steering direction (and therefore the difference in heading between the front vehicle portion 110 and the rear vehicle portion 120). The wheel positions may be determined based on the steering angle provided by the angle sensor 240. Thus, for example, a lookup table 280 may be stored in the memory 214 to indicate a normal or default base limit for a steering angle of zero. The lookup table 280 may modify the normal base limit to determine the calculated base limit based on the steering angle for any non-zero steering angle. The calculated base limit values in the lookup table 280 may therefore be directly related to the steering angle and information specific to a model of the vehicle 100.

The calculated base limit values may be experimentally determined for each model of the vehicle 100.

The determined center of gravity may also be calculated by the stability module 220 based on various inputs received thereat. In this regard, for example, the lookup table 280 may store tables for center of gravity location (on or relative to a body or chassis of the vehicle 100). In some cases, a base table may be provided (again experimentally determined for each model) with center of gravity location for driving with a zero steering angle. The base table may then be modified (or other tables may be provided) for respective modifications that are made from the base situation in relation to vehicle speed (or acceleration/deceleration), vehicle orientation, steering angle, and weight of the driver 170. In some cases, additional modifications may be made (or separate tables made) for the accessories attached (as determined by the accessory input 250) and the position of the seat (as determined by input from the seat position sensor 232). The stability module 220 may then compare the determined center of gravity to the calculated base limit to determine a tilt status (or proximity to the tipping point).

In an example embodiment, the stability module 220 may continuously (or periodically at relatively short intervals (e.g., every few seconds)) calculate the tilt status as described above, or using other similar methods. The stability module 220 may then generate an alert or instruction 260, which can be provided to the driver 170 at the control panel 40 or other user interface of the vehicle 100. If an alert is issued, the alert may indicate that the driver 170 should drive carefully or take action to improve stability. However, in some cases, the alert may actually provide information (general or specific) that will improve stability. For example, general information may include an alert to slow down, turn down-slope, or reduce the steering angle. More specific information may take the form of instructions, and may include instructions to decrease speed by braking or reducing accelerator input, or to turn in a particular direction or at a particular amount.

In some cases, rather than providing guidance or information, the stability module 220 may automatically initiate controls to improve stability. In this regard, for example, the stability module 220 may issue commands for any or all of steering control 270, speed control 272 and brake control 274. Thus, the stability module 220 may interact with the ECU or directly with components of the vehicle 100 that control braking, speed and steering inputs in order to improve the stability of the vehicle 100 if certain thresholds or tripwires related to the tilt status are reached.

Figure 6:
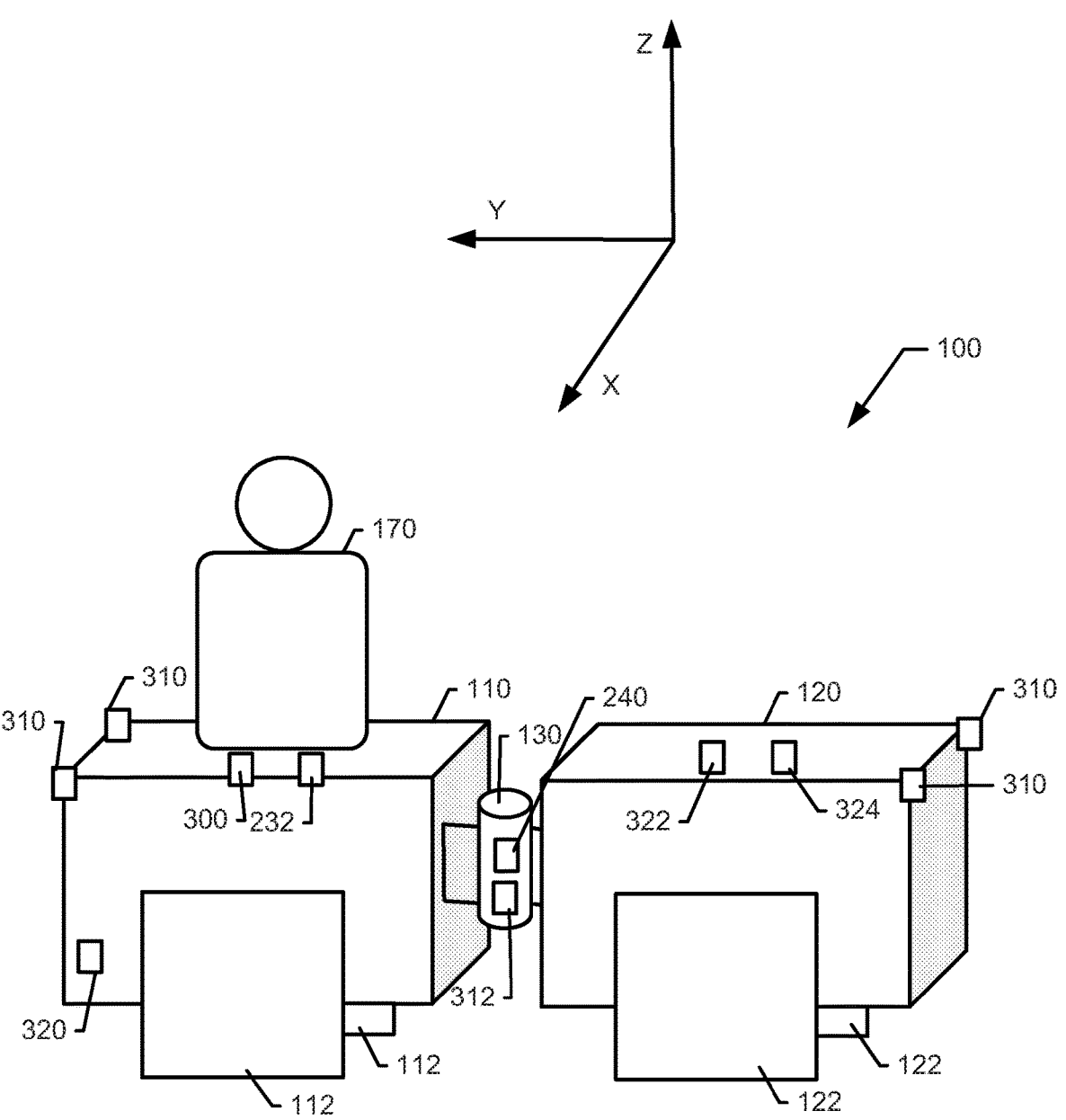
FIG. 6 illustrates a perspective view of various components of the tilt monitoring assembly.

FIG. 6 illustrates a schematic view of the vehicle 100 and various sensors that may be incorporated thereon in some cases. The sensors shown may be, or be parts of, any or all of the weight sensor assembly 230, the seat position sensor 232, the angle sensor 240, the orientation assembly 242, the speed sensor 244, or the like. However, it should be appreciated that other arrangements and sensors may be used in alternative embodiments.

Referring now to FIG. 6, the front vehicle portion 110 may include a weight sensor 300 and the seat position sensor 232, each of which may be disposed proximate to the driver 170 and seat 20 on which the driver 170 sits to operate the vehicle 100. At least one accelerometer 310 may also be provided on the front vehicle portion 110. The accelerometer 310 may be part of the orientation assembly 242. In some cases, at least one accelerometer 310 may also be provided on the rear vehicle portion 120. However, as another alternative, a single accelerometer 312 may be provided at a central location (e.g., proximate to the articulated joint 130).

As still another alternative, an instance of the accelerometer 310 (or another orientation sensor) may be provided at each corner of the vehicle 100 to improve accuracy regarding determinations of the orientation of the vehicle 100 in three dimensional space. The angle sensor 240 of this example is also located at the articulated joint 130.

As noted above, various other sensors and components may also be integrated into the vehicle 100. In this regard, for example, a front mount appliance detector 320 may be provided to detect the presence (and therefore also the weight) of the cutting deck or any other front mounted attachment. A bagging attachment detector 322 or weight sensor 324 may also be provided if a bagging attachment can also be added. Each of these components may provide inputs that can be used by the stability module 220 in real time to make tilt status determinations as described above.

FIG. 7 illustrates a block diagram of a method according to an example embodiment. The method may be a control algorithm executed by the processing circuitry of or associated with the stability module 220. The method may include receiving speed information indicative of a current speed of the vehicle at operation 500, receiving orientation information indicative of a three dimensional orientation of the vehicle at operation 510, receiving angle information indicative of an angular difference between first and second portions of the vehicle at operation 520 and receiving weight information indicative of a weight of the operator at operation 530. Operations 500 to 530 may be performed in any order. The method may further include determining a tilt status based on the speed information, the orientation information and the angle information at operation 540 and providing an output associated with operation of the vehicle based on the tilt status at operation 550.

Some embodiments of the invention provide a riding yard maintenance vehicle. The vehicle may include an articulated frame having a first portion to which front wheels of the vehicle are attached and a second portion to which rear wheels of the vehicle are attachable, a steering assembly operably coupled to the front wheels or the rear wheels of the vehicle to provide steering inputs by an operator of the vehicle, and a tilt monitoring assembly including processing circuitry. The processing circuitry may be configured to receive speed information indicative of a current speed of the vehicle, receive orientation information indicative of a three dimensional orientation of the vehicle, receive angle information indicative of an angular difference between the first and second portions of the vehicle, receive weight information indicative of a weight of the operator, determine a tilt status based on the speed information, the orientation information and the angle information, and provide an output associated with operation of the vehicle based on the tilt status.

In some embodiments, the tilt monitoring assembly of the vehicle may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the weight information may further include information associated with a weight of one or more accessories operably coupled to the vehicle. In an example embodiment, the weight information may further include information associated with seat position for a seat of the vehicle. In some cases, determining the tilt status may include determining a center of gravity for the vehicle based on the speed information, the orientation information (e.g., with optional input from map data that could be used, for example, for predictions) and the weight information, and determining a calculated base limit to compare to the center of gravity to determine the tilt status. In an example embodiment, the calculated base limit may be determined based on a steering angle of the vehicle, and the center of gravity may also be determined based on the steering angle and acceleration or deceleration applied at the steering angle. In some cases, the output may be an alert or instruction associated with vehicle control based on the tilt status. Alternatively or additionally, the output may be a control instruction associated with steering control, speed control or brake control based on the tilt status.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tilt monitoring assembly for a yard maintenance vehicle, the assembly comprising processing circuitry configured to:
   receive speed information indicative of a current speed of the vehicle;
   receive orientation information indicative of a three dimensional orientation of the vehicle;
   receive weight information indicative of operator weight associated with a driver of the vehicle;
   determine a tilt status based on the speed information, the orientation information and the weight information; and
   provide an output associated with operation of the vehicle based on the tilt status,
   wherein the output comprises an alert or instruction to the driver associated with vehicle control based on the tilt status, or an automatically initiated control instruction associated with steering control, speed control or brake control based on the tilt status.

2. The assembly of claim 1, wherein the weight information further includes information associated with a weight of one or more accessories operably coupled to the vehicle.

3. The assembly of claim 1, wherein the weight information further includes information associated with seat position for a seat of the vehicle.

4. The assembly of claim 1, wherein determining the tilt status comprises determining a center of gravity for the vehicle based on the speed information, the orientation information and the weight information, and determining a calculated base limit to compare to the center of gravity to determine the tilt status.

5. The assembly of claim 4, wherein the calculated base limit is determined based on a steering angle of the vehicle, and
   wherein the center of gravity is also determined based on the steering angle and acceleration or deceleration applied at the steering angle.

6. The assembly of claim 5, wherein the vehicle comprises an articulated joint separating a first part of the vehicle at which front wheels of the vehicle are disposed from a second part of the vehicle at which rear wheels of the vehicle are disposed.

7. The assembly of claim 6, wherein the steering angle is determined by an angle sensor disposed at the articulated joint.

8. A tilt monitoring assembly for an articulated yard maintenance vehicle, the assembly comprising processing circuitry configured to:
   receive speed information indicative of a current speed of the vehicle;
   receive orientation information indicative of a three dimensional orientation of the vehicle;
   receive angle information indicative of an angular difference between headings of a first part of the vehicle at which front wheels are disposed and a second part of the vehicle at which rear wheels are disposed, the first and second parts of the vehicle being operably coupled via an articulated joint;
   determine a tilt status based on the speed information, the orientation information and the angle information; and
   provide an output associated with operation of the vehicle based on the tilt status,
   wherein the output comprises an alert or instruction to the driver associated with vehicle control based on the tilt status, or an automatically initiated control instruction associated with steering control, speed control or brake control based on the tilt status.

9. The assembly of claim 8, wherein the processing circuitry is further configured to receive weight information indicative of operator weight associated with a driver of the vehicle and determine the tilt status based on the weight information.

10. The assembly of claim 9, wherein the weight information further includes information associated with a weight of one or more accessories operably coupled to the vehicle.

11. The assembly of claim 9, wherein the weight information further includes information associated with seat position for a seat of the vehicle.

12. The assembly of claim 8, wherein determining the tilt status comprises determining a center of gravity for the vehicle based on the speed information, the orientation information and the angle information, and determining a calculated base limit to compare to the center of gravity to determine the tilt status.

13. The assembly of claim 12, wherein the calculated base limit is determined based on the steering angle of the vehicle, and wherein the center of gravity is also determined based on the steering angle and acceleration or deceleration applied at the steering angle.

14. A riding yard maintenance vehicle comprising:

an articulated frame comprising a first portion to which front wheels of the vehicle are attached and a second portion to which rear wheels of the vehicle are attachable;

a steering assembly operably coupled to the front wheels or the rear wheels of the vehicle to provide steering inputs by an operator of the vehicle; and a tilt monitoring assembly comprising processing circuitry configured to:

receive speed information indicative of a current speed of the vehicle;

receive orientation information indicative of a three dimensional orientation of the vehicle;

receive angle information indicative of an angular difference between the first and second portions of the vehicle;

receive weight information indicative of a weight of the operator;

determine a tilt status based on the speed information, the orientation information and the angle information; and provide an output associated with operation of the vehicle based on the tilt status, wherein the output comprises an alert or instruction to the driver associated with vehicle control based on the tilt status, or an automatically initiated control instruction associated with steering control, speed control or brake control based on the tilt status.

15. The vehicle of claim 14, wherein determining the tilt status comprises determining a center of gravity for the vehicle based on the speed information, the orientation information and the angle information, and determining a calculated base limit to compare to the center of gravity to determine the tilt status.

* * * * *